(12) United States Patent
Stein et al.

(10) Patent No.: US 11,441,614 B1
(45) Date of Patent: Sep. 13, 2022

(54) FAST RELEASE MECHANISM FOR TWIN PLATE FRICTION CLUTCHES

(71) Applicant: Illinois Auto Truck Co., Inc., Des Plaines, IL (US)

(72) Inventors: Richard H. Stein, West Palm Beach, FL (US); Jordan R. Stein, Highland Park, IL (US); Corneliu Anta, Wood Dale, IL (US); Joseph V. Laxamana, Lisle, IL (US); Vadim Tikhonov, Buffalo Grove, IL (US)

(73) Assignee: ILLINOIS AUTO TRUCK CO., INC., Des Plaines, IL (US)

( * ) Notice: Subject to any disclaimer, the term of this patent is extended or adjusted under 35 U.S.C. 154(b) by 3 days.

(21) Appl. No.: 17/171,541

(22) Filed: Feb. 9, 2021

(51) Int. Cl.
*F16D 13/75* (2006.01)
*F16D 13/38* (2006.01)

(52) U.S. Cl.
CPC ......... *F16D 13/757* (2013.01); *F16D 13/385* (2013.01)

(58) Field of Classification Search
CPC ......... F16D 13/385–505; F16D 13/757; F16D 13/69
USPC ......... 192/70.252, 70.27–70.28, 111.3, 111.4
See application file for complete search history.

(56) References Cited

U.S. PATENT DOCUMENTS

| | | | |
|---|---|---|---|
| 4,114,740 A * | 9/1978 | Sugiura | F16D 13/505 |
| | | | 192/89.23 |
| 4,339,023 A | 7/1982 | Maycock | |
| 4,940,124 A * | 7/1990 | Galuska | F16D 13/52 |
| | | | 192/70.28 |
| 4,941,557 A | 7/1990 | Flotow | |
| 5,054,597 A | 10/1991 | Tarlton, Sr. | |
| 6,039,161 A * | 3/2000 | Tanaka | F16D 13/385 |
| | | | 192/70.252 |
| 6,409,002 B1 | 6/2002 | Orlamünder et al. | |
| 8,146,726 B2 | 4/2012 | McCutcheon et al. | |
| 8,459,427 B2 | 6/2013 | McCutcheon et al. | |
| 10,605,312 B2 | 3/2020 | McCutcheon et al. | |
| 2009/0314601 A1* | 12/2009 | Copeland | F16D 13/52 |
| | | | 192/102 |
| 2020/0224730 A1 | 7/2020 | McCutcheon et al. | |

* cited by examiner

*Primary Examiner* — David R Morris
(74) *Attorney, Agent, or Firm* — Patzik, Frank & Samotny Ltd.

(57) ABSTRACT

A fast release mechanism for a twin plate friction clutch including a biasing member positioned between the intermediate plate and the flywheel surface, and a retaining member for retaining the biasing member in place relative to the intermediate plate or flywheel surface during installation. In one embodiment, the fast release mechanism comprises a spring and a clip that retains the spring in place relative to the intermediate plate. When used with positioner pins extending through the intermediate plate, each clip may be U-shaped and includes a hole on its upper wall and a slot on its lower wall sized to receive the pin. The arms defining the slot extend partly over the end of the springs to keep the spring in place.

11 Claims, 5 Drawing Sheets

FAST RELEASE MECHANISM FOR TWIN PLATE FRICTION CLUTCHES

FIELD OF THE INVENTION

This invention relates generally to twin plate friction clutches and, more particularly, to fast release mechanisms for twin plate friction clutches.

BACKGROUND OF THE INVENTION

Clutches engage and disengage two moving parts relative to one another. In vehicles, clutches are used to transfer or interrupt the transfer of torque from the engine to the transmission or other drivetrain components. Particularly, they are used to change gears to control the amount of power that is transferred from the vehicle's engine to the transmission to make the vehicle move. This is accomplished through a clutch disc or driving member that can be selectively frictionally engaged with a driving surface of a flywheel that is connected to the engine crankshaft.

Commonly, the clutch cover is bolted to the flywheel, and an axially movable pressure plate is attached to the clutch cover through a mechanism controlled by a release bearing. When the clutch is engaged, the pressure plate is biased against a clutch disc and compressed together with the driving member or flywheel by springs acting against the clutch cover. Disengagement of the clutch by depressing the clutch pedal releases the pressure plate from contact with the flywheel to allow the gears to be changed in the vehicle.

Twin plate clutches utilize an intermediate pressure plate between the pressure plate and the clutch disc or driven member. A first friction disc assembly or clutch disc is positioned between the driving surface of the flywheel on one side and the intermediate plate surface on the other side. A second friction disc assembly or clutch disc is positioned between the other side of the intermediate plate on one side and the pressure plate on the other side. In operation, springs urge the pressure plate towards the flywheel, wherein the first friction disc assembly, the second friction disc assembly and the intermediate plate are compressed together into the flywheel to transfer torque from the flywheel to the transmission.

When the clutch pedal is depressed, it moves a release bearing or member, through springs, straps and/or levers, that pulls the pressure plate away from the flywheel. As the surfaces of the friction disc assemblies wear during use, the length of travel of the components of the clutch assembly thereby increases between the engaged and disengaged positions. As movement of the release member tended to urge the intermediate plate towards its original position, positioner pins have been utilized to adjust the relative position of the intermediate plate during continued operation of the clutch. One example of such positioner pins is disclosed in U.S. Pat. No. 4,941,557, the entirety of which is hereby incorporated by reference.

In the current design of twin plate clutches, there is a time delay between when the pressure plate is moved away or retracted and when the front disc assembly friction surface is completely disengaged from the flywheel and intermediate surfaces. This can negatively affect the ability to utilize the clutch in connection with computer controlled automatic transmissions. Thus, it would be advantageous to provide a mechanism that improves the speed of completely separating the front disc assembly friction surfaces from the flywheel and the intermediate plate surfaces when the clutch is disengaged.

BRIEF SUMMARY OF THE INVENTION

The present invention comprises a fast release mechanism for a twin plate friction clutch. A plurality of springs or other biasing members are positioned in between the intermediate plate and the flywheel surface around the clutch. In one embodiment of a twin plate friction clutch utilizing positioner pins that act to vary the position of the intermediate plate relative to the clutch cover, the springs may be positioned to extend around at least part of the positioner pins. In order to retain the springs in place, especially relative to installation, a clip may be used to secure the spring relative to the intermediate plate or the flywheel.

The clip is generally U-shaped with upper and lower walls connected together by a connecting wall. When used on the intermediate plate having a hole extending therethrough for the positioner pin, the upper wall includes an opening sized to receive the positioner pin and which allows the pin to move therein to adjust the relative position of the intermediate plate during operation. The lower wall may include a slot defined by a pair of arms extending outwardly therefrom to allow the arms to extend around the positioner pin and over part of the spring to secure it in place thereto.

Accordingly, it is an object of the present invention to provide a mechanism for facilitating the disengagement of the clutch.

It is another object of the present invention to provide a mechanism for improving the speed of disengaging the clutch.

It is yet another object of the present invention is to provide a mechanism to improve the disengagement of the clutch that is economical and easy to install.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
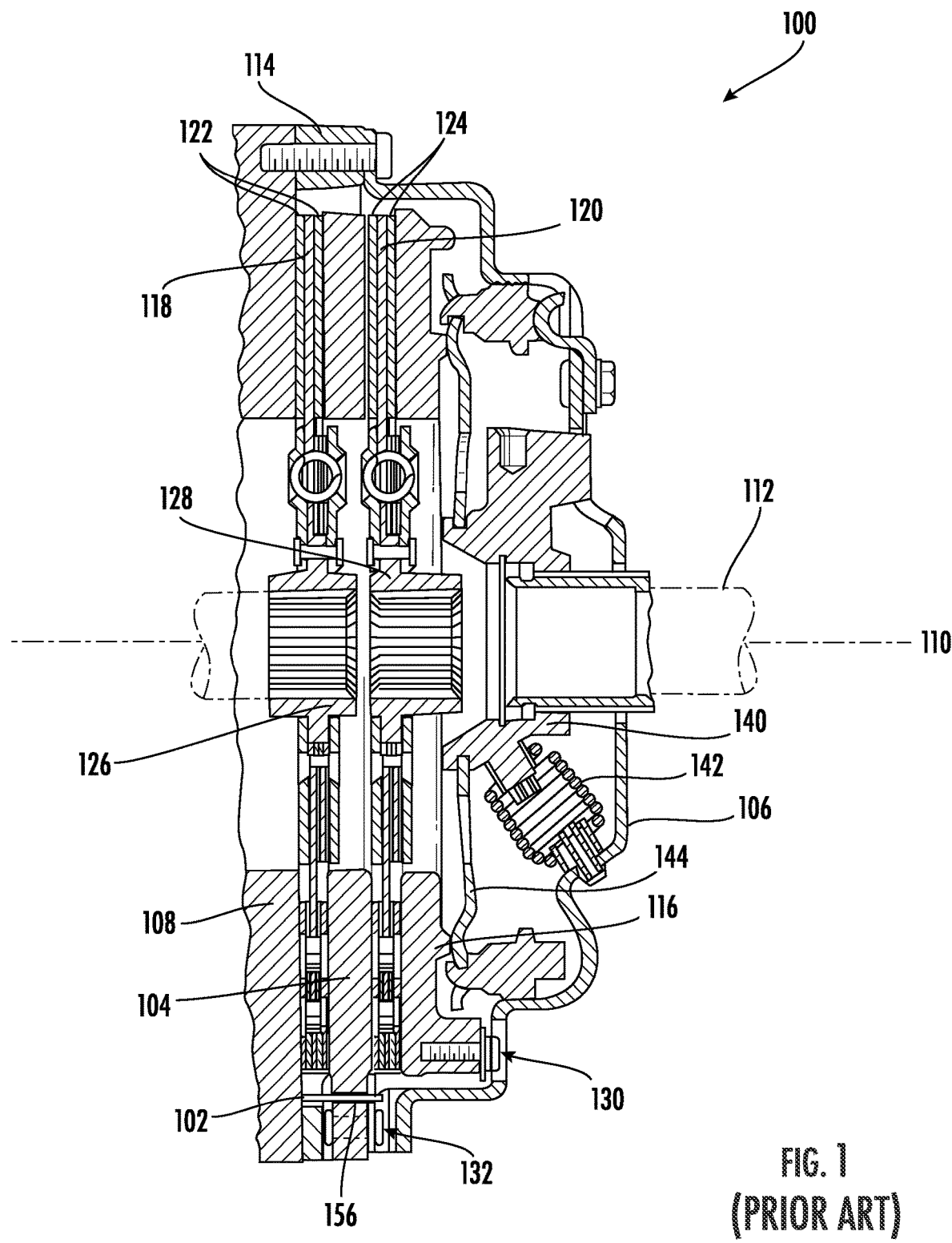
FIG. 1 is sectional view of a prior art twin plate friction clutch.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Figure 2:
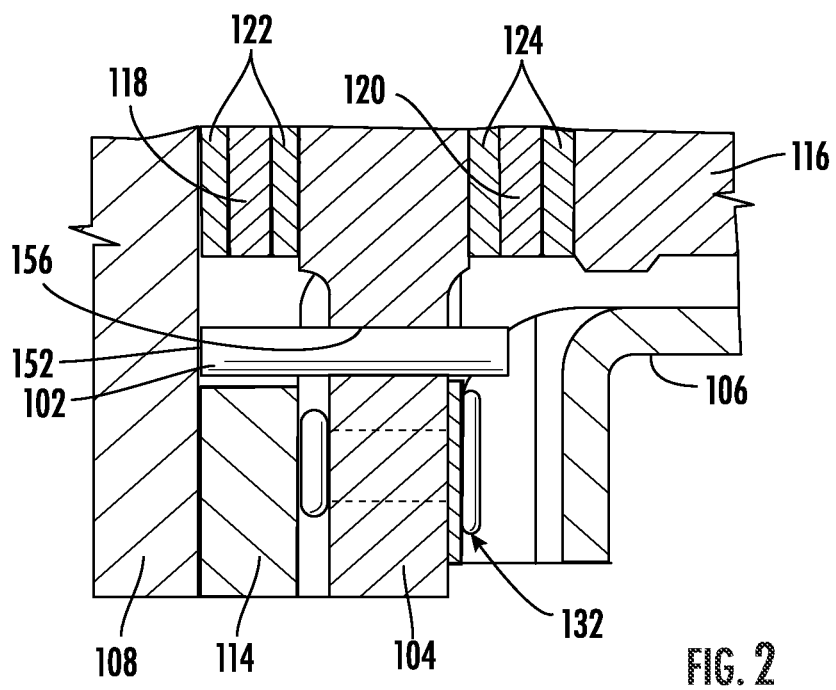
FIG. 2 is a partial sectional view of the twin plate friction clutch of FIG. 1 showing one embodiment of a positioner pin in an engaged position.
Figure 3:
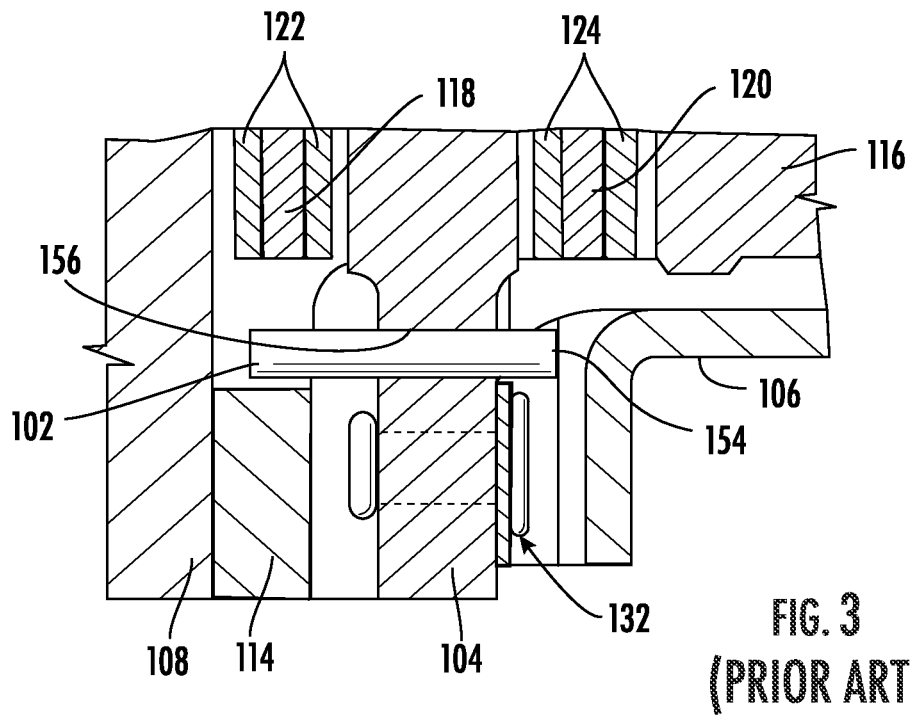
FIG. 3 is a partial sectional view of the twin plate friction clutch of FIG. 1 showing one embodiment of a positioner pin in a disengaged position.

FIGS. 1 through 3 illustrate a standard twin plate clutch system 100 utilizing positioner pins 102 to adjust the relative position of the intermediate plate 104 relative to the clutch cover 106 during continued operation of the clutch. The clutch cover 106 of the clutch assembly 100 is shown bolted or otherwise attached to a flywheel 108 of a vehicle to allow the cover 106 and flywheel 108 to rotate together about an axis 110 defined by a driven shaft 112. A spacer ring 114 or other adapter is positioned between the cover 106 and flywheel 108 to provide space for a pressure plate 116 and intermediate plate 104 therebetween. Both the intermediate plate 104 and pressure plate 116 are rotatably disposed about the shaft 112. First and second friction disc assemblies or clutch discs 118,120 each include friction surfaces or members 122,124 on opposite sides and a hub 126,128 that connects each of the friction disc assemblies 118,120 to the driven shaft 112 that extends therethrough and is operatively connected to a set of gears in a transmission (not shown).

The first friction disc assembly 118 is positioned between the surface of the flywheel 108 and the intermediate plate 104. The second friction disc assembly 120 is positioned between the intermediate plate 104 and the pressure plate 116. The cover 106 is rotationally connected to the pressure plate 116 through a first plurality of drive strap assemblies 130 and to the intermediate plate 104 through a second plurality of drive strap assemblies 132. One example of the structure and operation of the drive strap assemblies is disclosed in U.S. Pat. No. 4,566,573, the entirety of which is hereby incorporated by reference.

A release bearing or release member 140 is attached by springs 142 to a plurality of levers 144 to selectively engage and disengage the clutch. When the release member 140 is engaged, the levers 144 pivot anti-clockwise to move the pressure plate 116 away from engagement with the flywheel 108. When the release bearing 140 is disengaged, the springs 142 will act to pivot the levers 144 to move the pressure plate 116 to compress the first friction disc assembly 118, intermediate plate 104 and second friction disc assembly 120 together and towards the flywheel 108 to transfer torque from the flywheel 108 to the center hubs 126,128 of the disc assemblies 118,120 to the transmission.

Repeated engaging and disengaging of the clutch wears down the friction surfaces 122,124 of the first and second friction disc assemblies 118,120, which varies of the position of the clutch components relative to one another and may cause unwanted contact between the intermediate plate 104 and the friction disc assemblies 118,120. Adjustment of the relative position of the intermediate plate 104 may be done using a plurality of apertures 150 located around the outer portion 158 of the intermediate plate 104 for receiving positioner pins 102 therethrough. The pins 102 are sized so that they provide an interference fit with the apertures 150 so that they may move axially when a force is applied that exceeds the frictional force created by the interference fit.

Referring to FIG. 2, when the clutch assembly 100 is engaged, the ends 152 of the positioner pins 102 contact the flywheel surface 108. As the friction members or surfaces 122,124 of the friction disc assemblies 118,120 wear away from use, the intermediate plate 104 will be moved toward the flywheel 108 along the positioner pins 102. FIG. 3 shows the clutch assembly 100 in the disengaged position, wherein the other ends 154 of the positioner pins 102 contact the clutch cover 106 and maintain the intermediate plate 104 in spaced position between the pressure plate 116 and flywheel 108.

Figure 4:
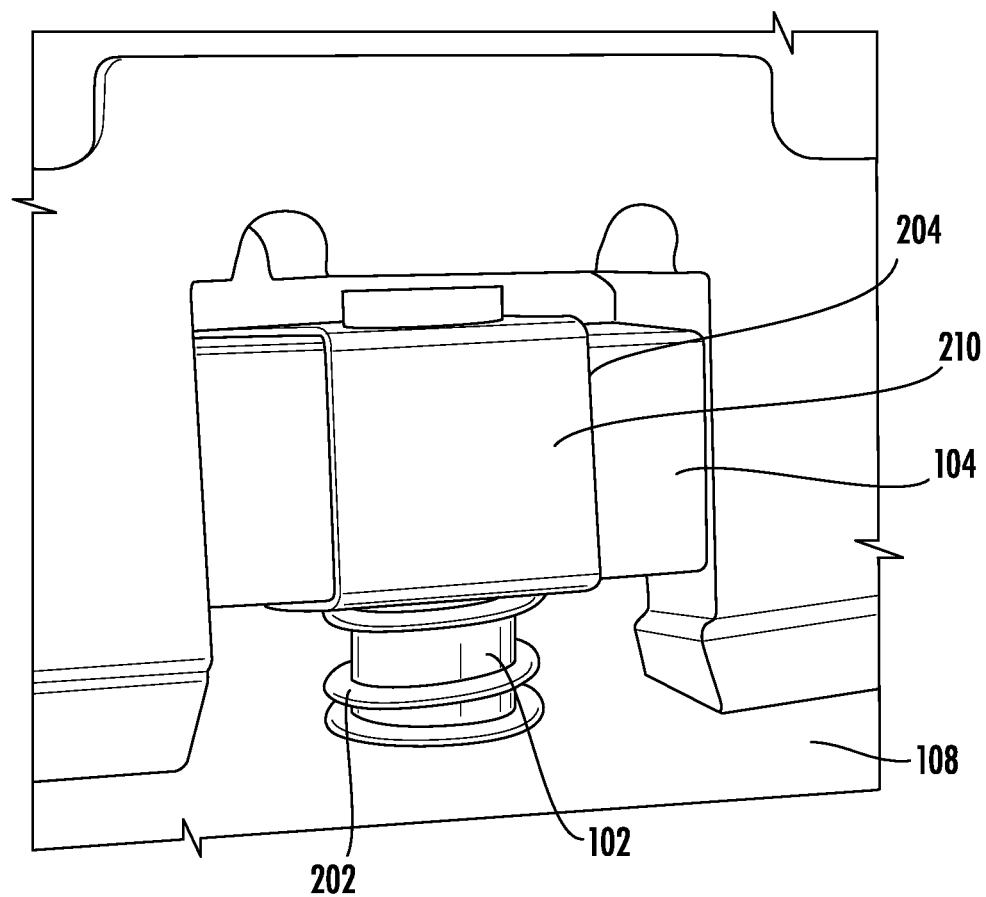
FIG. 4 is a partial perspective view of the twin plate friction clutch of FIG. 1 illustrating one embodiment of the fast release mechanism of the present invention utilized thereon.
Figure 5:
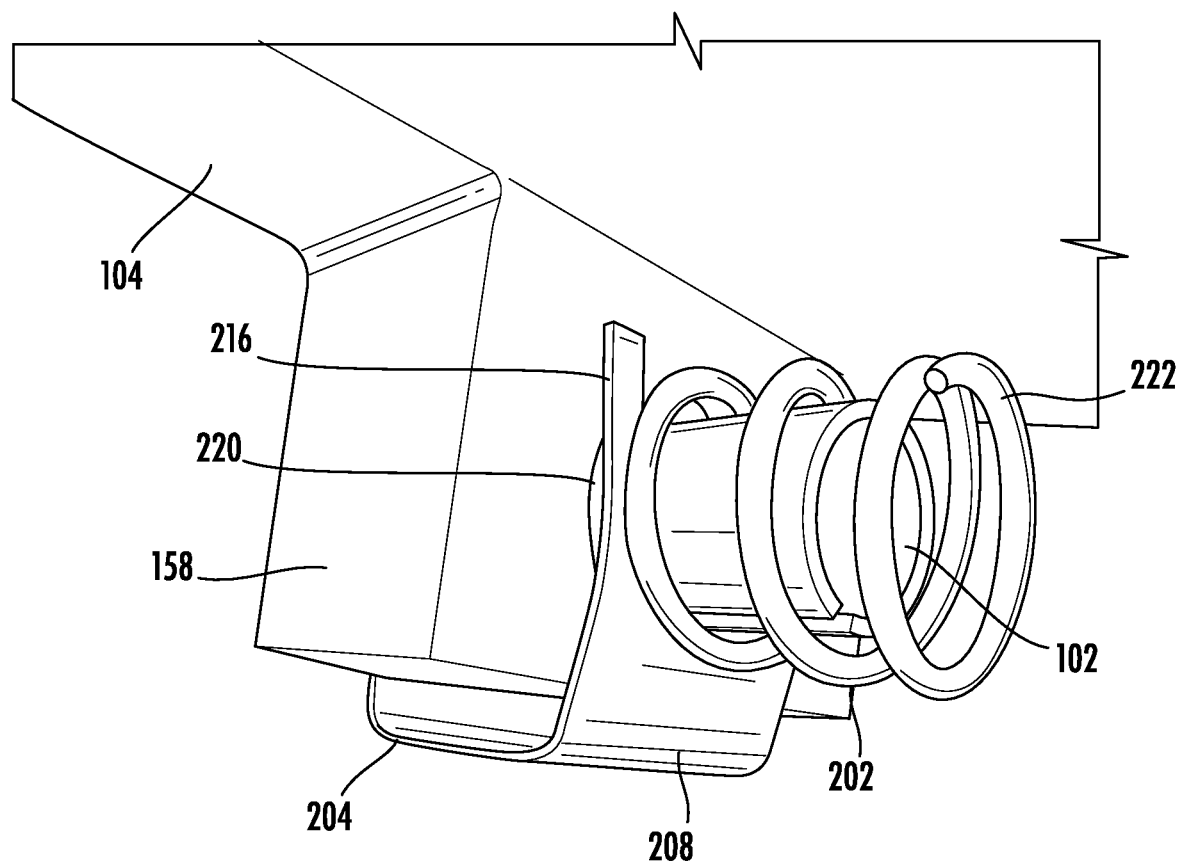
FIG. 5 is a partial perspective view of the fast release mechanism of FIG. 4 installed on an intermediate plate.
Figure 6:
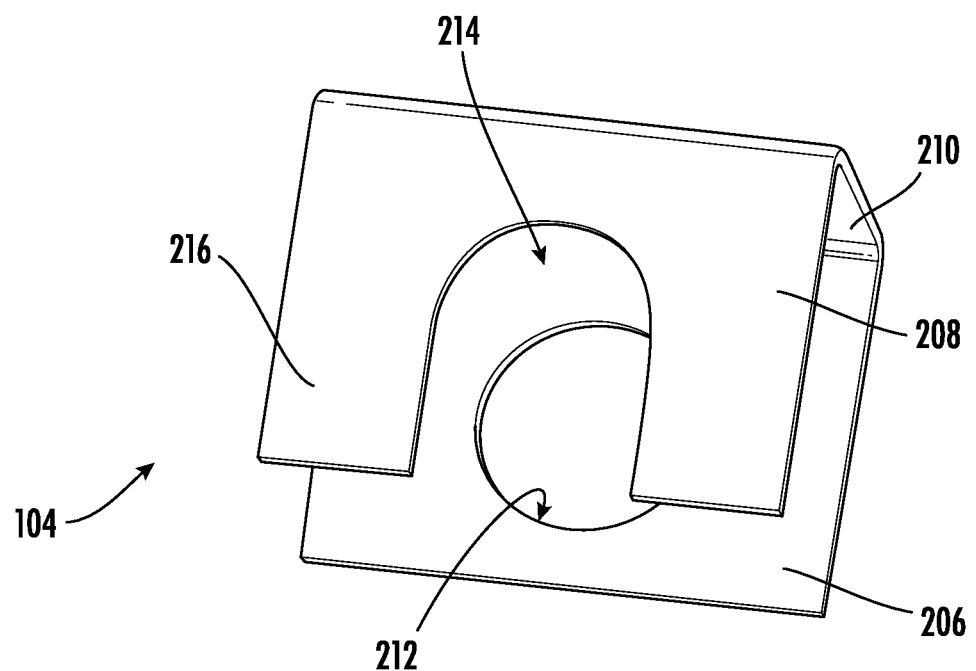
FIG. 6 is a perspective view of one embodiment of a clip of the fast release mechanism of the present invention.

Referring to FIGS. 4 and 5, one embodiment of the fast release mechanism 200 of the present invention is shown as applied to the intermediate plate 104. The fast release mechanism 200 includes a spring 202 and a clip 204. While a coil spring is shown and disclosed, it is appreciated that the fast release mechanism may utilize a variety of other known biasing members including, but not limited to, strap springs, Belleville washers or leaf springs and not depart from the scope of the present invention. Further, while the fast release mechanism is shown being positioned relative to the intermediate plate, it is appreciated that it may alternatively be positioned or attached to or relative to the flywheel surface.

The clip 204 is generally U-shaped with upper and lower walls 206,208 connected together by a connecting wall 210. The clip 204 may be made of steel or other materials having a suitable strength for retaining the end 220 of the spring 202 in place. When used on the intermediate plate 104 having a hole 156 extending therethrough for the positioner pin 102, the upper wall 206 includes an opening 212 sized to receive the positioner pin 102 and which allows it to move therein to adjust the relative position of the intermediate plate 104 during operation. The lower wall 208 includes a slot 214 defined by a pair of arms 216 extending outwardly therefrom. As shown in FIG. 5, one end 220 of the spring 202 is held in place by the arms 216 of the clip 204 to retain the spring 202 in place during installation of the clutch, while the other end 222 of the spring 202 remains free. While a clip is shown and disclosed, other retaining members may be used to secure the end of the spring relative to the intermediate plate or flywheel including, but not limited to, screws, rivets or snap rings.

In operation relative to the embodiment shown and disclosed in the drawings, after the springs 202 are placed over the positioner pins 102, the clips 204 are slid over the outer portions 158 of the intermediate plate 104 such that the positioner pins 102 extend through the holes 212 on the upper walls 206 of the clips 204 and the arms 216 of the lower walls 208 of the clips 204 extend over parts of the ends 220 of the springs 202, thus securing the springs 202 in place to facilitate attachment of the clutch to the flywheel 108.

It will be understood that modifications and variations may be effected without departing from the spirit and scope of the present invention. It will be appreciated that the present disclosure is intended as an exemplification of the invention and is not intended to limit the invention to the specific embodiment illustrated and described. The disclosure is intended to cover, by the appended claims, all such modifications as fall within the scope of the claims.

The invention claimed is:

1. A fast release mechanism for twin plate friction clutches having a pressure plate, an intermediate plate, a flywheel, the fast release mechanism comprising:
   a bias member positioned between the intermediate plate and the flywheel, the bias member having a first end and a second end; and
   a retaining member retaining one of the first end and second end relative to the intermediate plate or the flywheel, wherein the retaining member is a U shaped clip that is sized to fit over an outer portion of the intermediate plate.

2. The fast release mechanism of claim 1 wherein the bias member is a spring.

3. The fast release mechanism of claim 2 wherein the bias member is a coil spring.

4. In a twin plate friction clutch assembly having a flywheel, a cover attached to the flywheel, a pressure plate disposed between the flywheel and the cover, an intermediate plate disposed between the flywheel and the pressure plate, a first friction disc assembly disposed between the flywheel and the intermediate plate, a second friction disc assembly disposed between the intermediate plate and the pressure plate, and a plurality of positioner pins extending through apertures in the intermediate plate and being maintained therein through interference fits, the positioner pins operating to adjust the position of the intermediate plate as friction faces of the first and second friction disc assemblies wear thinner, the improvement comprising:

a spring positioned between the intermediate plate and the flywheel, the spring partially surrounds one of the positioner pins and has a first end and a second end; and a clip retaining one of the first end and second end of the spring relative to the intermediate plate or the flywheel.

5. The twin plate friction clutch assembly of claim 4 wherein the spring is a coil spring.

6. The twin plate friction clutch assembly of claim 4 wherein the clip retains the first end of the spring relative to the intermediate plate.

7. The twin plate friction clutch assembly of claim 6 wherein the clip is substantially U-shaped with an upper wall having an opening sized for receiving part of the positioner pin and a lower wall having a pair of arms that define a slot for positioning the clip around the positioner pin, the pair of arms sized for retaining the first end of the spring in place.

8. In a twin plate friction clutch assembly having a flywheel, a cover attached to the flywheel, a pressure plate disposed between the flywheel and the cover, an intermediate plate disposed between the flywheel and the pressure plate, a first friction disc assembly disposed between the flywheel and the intermediate plate, a second friction disc assembly disposed between the intermediate plate and the pressure plate, and a plurality of positioner pins extending through apertures in the intermediate plate and being maintained therein through interference fits, the positioner pins operating to adjust the position of the intermediate plate as friction faces of the first and second friction disc assemblies wear thinner, the improvement comprising:

a plurality of springs positioned between the intermediate plate and the flywheel, the springs partially surround the positioner pins and each of the springs has a first end and a second end; and clips retaining one of the first end and second end of each of the springs relative to the intermediate plate or the flywheel.

9. The twin plate friction clutch assembly of claim 8 wherein the springs are coil springs.

10. The twin plate friction clutch assembly of claim 8 wherein the clips retain the first ends of the springs relative to the intermediate plate.

11. The twin plate friction clutch assembly of claim 10 wherein the clips are each substantially U-shaped with an upper wall having an opening sized for receiving part of the positioner pin and a lower wall having a pair of arms that define a slot for positioning the clip around the positioner pin, the pair of arms sized for retaining the first end of the spring in place.

\* \* \* \* \*